No. 861,330. PATENTED JULY 30, 1907.
N. J. SUCKLING.
WATER TUBE STEAM GENERATOR.
APPLICATION FILED AUG. 6, 1906.
4 SHEETS—SHEET 1.
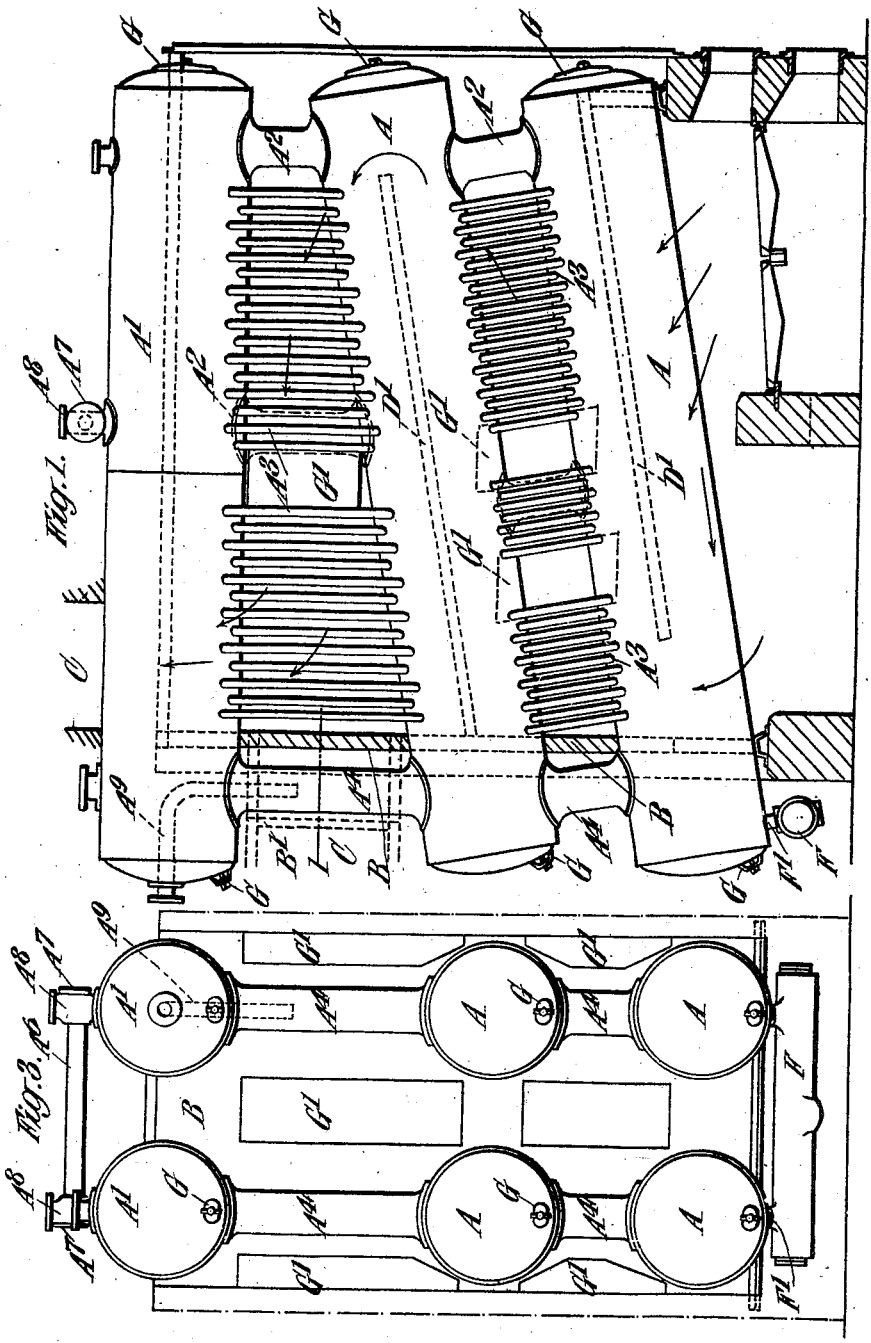
Witnesses
J. M. Wynkoop
A. W. Knight
Inventor
Newton John Suckling
By Knight Bros.
Attys.

No. 861,330.
PATENTED JULY 30, 1907.
N. J. SUCKLING.
WATER TUBE STEAM GENERATOR.
APPLICATION FILED AUG. 6, 1906.
4 SHEETS—SHEET 2.
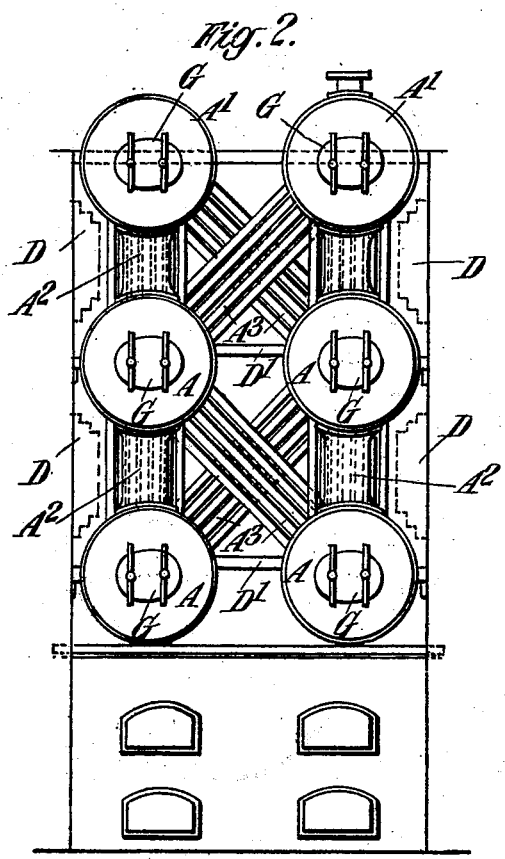

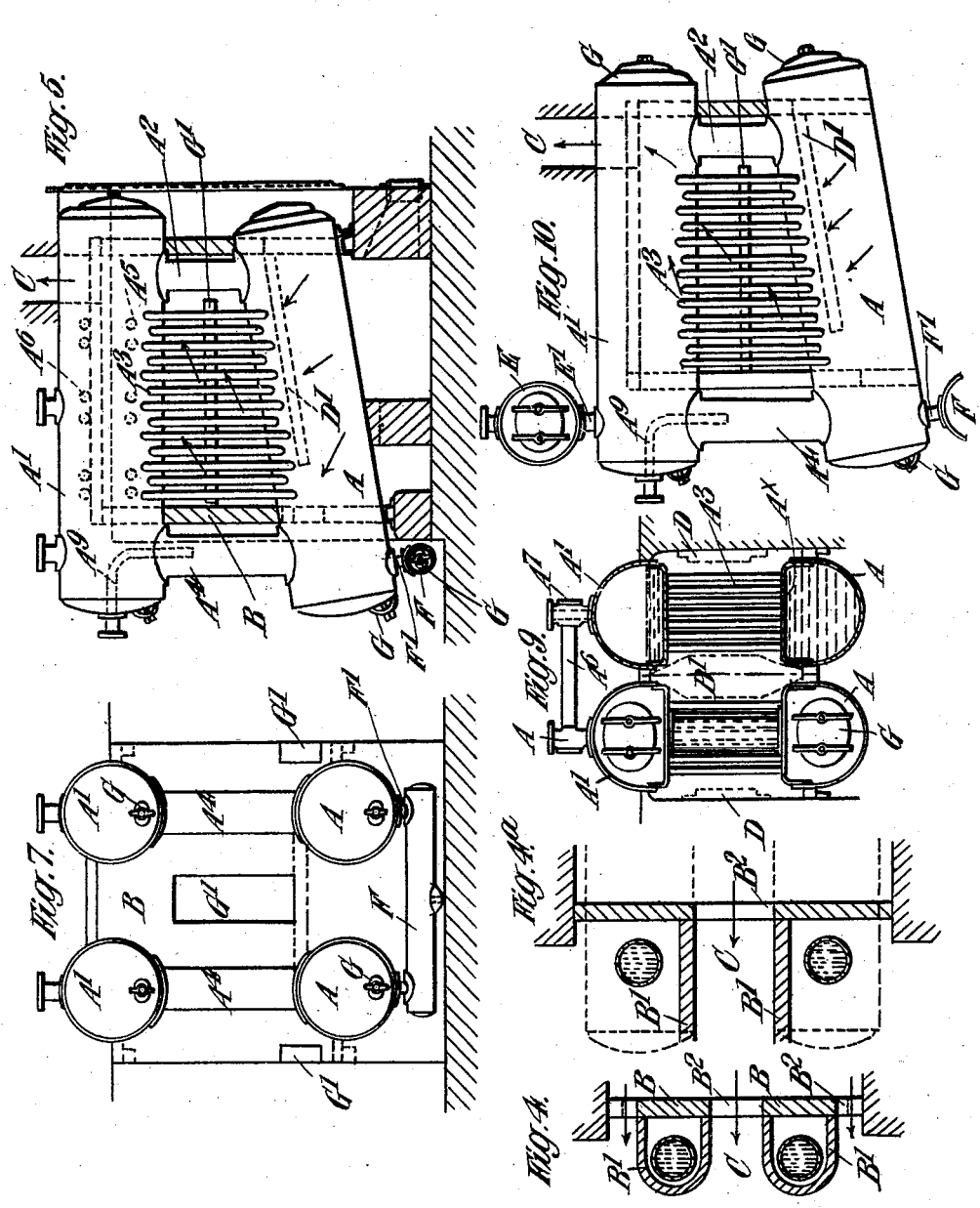

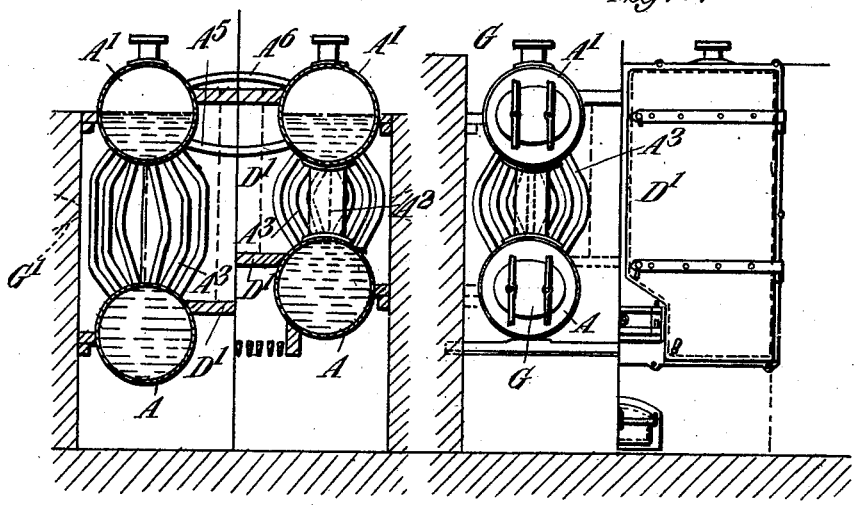
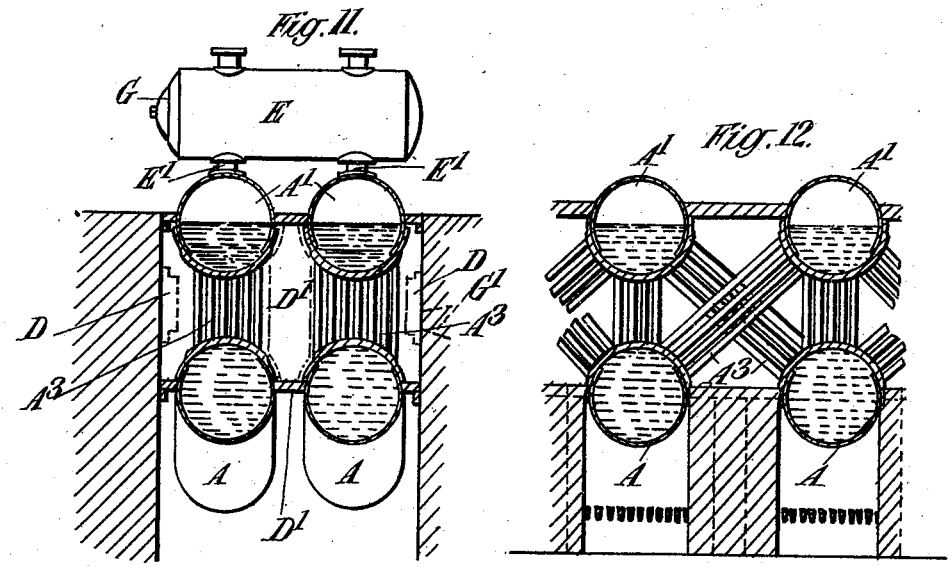

UNITED STATES PATENT OFFICE.

NEWTON JOHN SUCKLING, OF BRIGHTON, ENGLAND.

WATER-TUBE STEAM-GENERATOR.

No. 861,330.      Specification of Letters Patent.      Patented July 30, 1907.

Application filed August 6, 1906. Serial No. 329,475.

*To all whom it may concern:*

Be it known that NEWTON JOHN SUCKLING, a subject of the King of Great Britain, residing at The Drove, Preston Park, Brighton, in the county of Sussex, England, consulting engineer, has invented certain new and useful Improvements Relating to Water-Tube Steam-Generators, of which the following is a specification.

This invention relates to water-tube steam generators the chief objects being to provide a generator of large water and steam capacity, and of simple, effective and economical construction, the arrangement being such as to expose large heating surface to the furnace gases, and to promote a constant and efficient circulation of the water.

Heretofore it has been customary in the design of water-tube steam generators to arrange the various parts in such a manner that the steam produced may assist in the circulation of the water, but it is now generally admitted that circulation is almost wholly due to the differences in temperature of the water in different parts of the generator.

According to this invention I provide beneath a horizontal water drum or drums a number of inclined water drums projecting at their extremities beyond the walls of the furnace, so that the rearwardly projecting portions, not being exposed to the furnace gases, are at a lower temperature than the remaining portions, and consequently produce a descending current of water through neck pieces connecting the aforesaid projecting portions with each other and with corresponding projecting portions of the horizontal water drum or drums. The inclined water drums are preferably arranged in vertical rows and are connected by a convenient number of neck pieces and sets of tubes for liberating the steam generated, and for promoting and assisting in the constant and uniform circulation of the water. The uppermost of the large inclined water drums is in communication with the horizontal water drum in which the water level is preferably maintained at or near the center line, so that the free water surface is as great as practicable. A complete steam generator will when of large size usually comprise several sections, each of which consists of a series of inclined water drums, a horizontal water drum, and suitably arranged neck pieces and connecting tubes as above described. A steam dome or collector may be situated above and suitably connected with each of the horizontal water drums pertaining to the several sections, and the projecting end of the lowermost of each of the inclined drums is in communication with a mud drum conveniently situated outside the furnace, so that sediment and other refuse may be easily removed or blown out in the usual way. The rear portions of the inclined and horizontal water drums and the neck pieces pertaining to and connecting the same, by being outside the furnace, are at a sufficiently low temperature to create a constant downward current or circulation of the water, the neck pieces and other parts in or near the flues being protected from the direct action of the heated gases by being incased in or surrounded by fire-brick or the like so as to prevent said heated gases from unduly raising the temperature of the neck pieces, in cases where flues are provided at the back of the furnace.

In order that my said invention may be clearly understood and readily carried into effect, I will proceed to describe the same more fully with reference to the accompanying drawings in which:—

Figure 1 is a longitudinal section of a steam generator constructed in the manner herein described. Fig. 2 is a front elevation and Fig. 3 a back elevation of the same. Fig. 4 is a detail horizontal section on the line 1—1 of Fig. 1. Fig. 4$^a$ is a similar detail horizontal section illustrating a method of protecting the neck pieces at the back of the furnace, when a central flue only is employed. Fig. 5 is a longitudinal sectional elevation of a modified form of construction, and Fig. 6 is a cross-section of the same, the left half of the section being taken towards the back of the generator, and the right half towards the front thereof. Fig. 7 is a back elevation, and Fig. 8 a front elevation of the modified construction, the front casing and door being removed in the left hand portion of the latter figure. Fig. 9 is a vertical cross section of a generator provided with flat plates for expanding the connecting tubes therein. Fig. 10 is a longitudinal section, and Fig. 11 a cross sectional elevation of a generator having a steam dome, and thickened portions in the horizontal and inclined water drums for the purpose of effecting the expanded joints as hereinafter described. Fig. 12 is a cross section of part of a generator in which several sets of horizontal and inclined water drums are arranged side by side and interconnected by connecting tubes.

A represents the inclined water drums, A′ the horizontal water drums, A$^2$ and A$^4$ the neck pieces, and A$^3$ the connecting water drums.

The inclined tubes A, are preferably arranged in vertical rows and have their extremities projecting beyond the walls B of the furnace. They are connected with each other and with the water drums A′ by means of the neck pieces A$^2$ and tubes A$^3$, the rearwardly projecting portions being connected by the neck pieces A$^4$ which are also situated outside the furnace. The said rearwardly projecting portions of the inclined water drums and the neck pieces A$^4$, not being exposed to the furnace gases, are at a lower temperature than the remainder of the generator, and consequently produce a descending current of water from the horizontal water drums A′ through neck pieces A$^4$ into the inclined water drums A, whence the water passes up the latter and through the tubes A$^3$ and neck pieces A$^2$ back to the said horizontal water drums A'. The water level in the latter is preferably maintained at or near the center line so that the maximum surface is provided for the liberation of steam whereby foaming and priming are also prevented.

The tubes $A^3$ may be either straight or curved and arranged vertically as in Figs. 6, 9 and 11, or vertically and diagonally as in Figs. 2 and 12 and may be of such a number and disposition that a constant and perfect circulation of water through the generator is secured.

In order to protect those portions of the neck pieces $A^4$ which pass beyond the rear wall B of the furnace into the flues C from becoming heated, they may be surrounded or protected by fire-brick or other suitable lining B', apertures $B^2$ being suitably arranged in the rear wall B to enable the products of combustion from the furnace to pass into the said flues C and thence to the smoke-stack. For the purpose of absorbing the greater part of the heat from the furnace gases before they escape into the flues, fire-brick or asbestos deflectors D and partitions or baffles D' may be arranged to compel the said gases to travel between and among the tubes $A^3$ and in a tortuous or zig-zag course. The said partitions or baffles D' may be fixed, or may be movable so as to facilitate in the latter case cleaning and inspection of the various parts of the generator.

The horizontal water drums A' may be connected with a stem drum or dome E by neck pieces E' as shown in Figs. 10 and 11, and the rearwardly projecting ends of the lowermost of the inclined water drums A may be connected with a mud drum F, which, being situated outside the furnace chamber, can be readily cleaned out periodically or entirely removed, if desired. Communication between the horizontal drums A is provided by means of the drum F through the neck pieces F' so that the same level of water is maintained in all the drums.

Additional communication between the water in the drums A' may be provided by means of connecting tubes $A^5$ situated as in Figs. 5 and 6 at or below the water level so that said level is maintained the same in all the drums. Similarly even distribution and equalization of pressure of the steam may be afforded by means of tubes $A^6$ directly connecting the drums as in Figs. 5 and 6 or expanded into boxes or stools $A^8$, secured to the said drums as shown in Figs. 1 and 2, the expanded joints being rendered easy of accomplishment by means of the openings and cover plates $A^7$, situated opposite the ends of the tubes $A^6$. The stools $A^8$ can also be employed for carrying stop valves, safety valves and similar steam generator accessories. A similar arrangement to that shown at $A^6$ $A^7$ and $A^8$ may also be applied—at or below the water level—for affording an additional free communication for the water between two or more sections and thereby assist in equalizing the water-level in the water-drums. The feed-water may be admitted at any suitable point or points in the generator, and may conveniently be introduced through an inlet pipe $A^9$, at which point the feed-water descends the tubes $A^4$, thus becoming somewhat warmed and depositing some of its sediment in the mud drum F before entering the heated parts of the generator.

One or both ends of the inclined water drums A, horizontal drums A', steam dome E and mud drum F may be provided with doors or manholes G and the walls of the furnace chamber may be provided with doors or openings G' so that every part of the generator can be readily inspected, repaired and thoroughly cleaned both internally and externally. Moreover the tubes $A^3$ which are preferably connected to the inclined and horizontal drums by being expanded therein, are so arranged that each individual tube can be removed or replaced without disturbing the remaining tubes, and for this purpose they may be passed through the aforesaid drums or replaced from the outside. The said tubes $A^3$ may be expanded into flat plates $A^\times$ riveted to the inclined water drums A and horizontal drums A' as in Fig. 9, or the said larger drums may be shaped so as to produce these flat surfaces. In a modified form of construction the inclined water drums A and horizontal drums A' are constructed of metal of appropriate thickness, there being sufficient metal in which to expand the tubes $A^3$, water-tight joints being readily obtained, so that leakage is prevented; a portion only of the said tubes or drums may, however, be of the requisite thickness to insure efficient expanded joints, the remaining portion being of the usual or ordinary degree of thickness, as shown in Figs. 11 and 12.

For marine purposes, or in other situations where space is limited, a single inclined water drum may be employed as shown in Figs. 5 and 10 and brick work may be dispensed with, a suitable framing or metal casing, lined or protected from heat by fire-brick, asbestos or other suitable material, being substituted.

All the necessary fittings and accessories employed in connection with steam generators of the water tube type may be used in conjunction with the generator above described.

I am aware that it has before been proposed to construct water tube steam generators with horizontal tubes or drums arranged one above the other and connected by circulating tubes, and that it has also been proposed to construct generators with horizontal tubes or drums having portions projecting beyond the furnace walls and connected by circulating tubes. I am also aware that the circulating tubes have been arranged outside the wall of the steam generator. So far as I am aware, however, a steam generator has not before been constructed in which the aforesaid features are combined in a steam generator of the kind hereinbefore described.

What I claim and desire to secure by Letters Patent of the United States is:—

1. In a water tube steam generator, the combination of an inclined water drum, a horizontal water drum situated vertically above said inclined water drum, furnace walls surrounding said water drums, means located within said walls for connecting said water drums, portions of the latter projecting at the rear beyond the furnace walls, and means located outside said walls for connecting the rearwardly projecting portions.

2. In a water tube steam generator, the combination of a plurality of inclined water drums located in a vertical row, a horizontal water drum situated vertically above said inclined water drums, furnace walls surrounding said water drums, means located within said walls for connecting said water drums, portions of the latter projecting at the rear beyond the furnace walls, and means located outside said walls for connecting the rearwardly projecting portions.

3. In a water tube steam generator, the combination of a plurality of inclined water drums located in a vertical row, a horizontal water drum situated vertically above said inclined water drums, furnace walls surrounding said water drums, neck pieces and connecting tubes located within said walls for connecting said water drums, portions of the latter projecting at the rear beyond the furnace walls, and neck pieces located outside said walls for connecting the rearwardly projecting portions.

4. In a water tube steam generator, the combination of a plurality of inclined water drums located in a vertical row, a horizontal water drum situated vertically above said inclined water drums, furnace walls surrounding said water drums, neck pieces and connecting tubes located within said walls for connecting said water drums, portions of the latter projecting at the rear beyond the furnace walls, neck pieces located outside said walls for connecting the rearwardly projecting portions, and heat resisting material for protecting those portions of the last mentioned neck pieces that project into the flues from the direct action of the furnace gases.

5. In a water tube steam generator, the combination of a series of sections, each consisting of an inclined water drum, a horizontal water drum situated vertically above said inclined water drum, furnace walls surrounding said water drums, means located within said walls for connecting said water drums, portions of the latter projecting at the rear beyond the furnace walls, and means located outside said walls for connecting the rearwardly projecting portions.

6. In a water tube steam generator, the combination of a series of sections, each consisting of an inclined water drum, a horizontal water drum situated vertically above said inclined water drum, furnace walls surrounding said water drums, neck pieces and connecting tubes located within said walls for connecting said water drums, portions of the latter projecting at the rear beyond the furnace walls, and neck pieces located outside said walls for connecting the rearwardly projecting portions.

7. In a water tube steam generator, the combination of a series of sections, each consisting of a plurality of inclined water drums located in a vertical row, a horizontal water drum situated vertically above said inclined water drums, furnace walls surrounding said water drums, means located within said walls for connecting said water drums, portions of the latter projecting at the rear beyond the furnace walls, and means located outside said walls for connecting the rearwardly projecting portions.

8. In a water tube steam generator, the combination of a series of sections, each consisting of a plurality of inclined water drums located in a vertical row, a horizontal water drum situated vertically above said inclined water drums, furnace walls surrounding said water drums, neck pieces and connecting tubes located within said walls for connecting said water drums, portions of the latter projecting at the rear beyond the furnace walls, and neck pieces located outside said walls for connecting the rearwardly projecting portions.

9. In a water tube steam generator, the combination of a series of sections, each consisting of an inclined water drum, a horizontal water drum situated vertically above said inclined water drum, furnace walls surrounding said water drums, neck pieces located within said walls for connecting said water drums, portions of the latter projecting at the rear beyond said furnace walls, neck pieces located outside said walls for connecting said rearwardly projecting portions, and a transverse mud drum connected with each of said inclined water drums at their rearwardly projecting portions.

10. In a water tube steam generator, the combination of a series of sections, each consisting of a plurality of inclined water drums located in a vertical row, a horizontal water drum situated vertically above said inclined water drums, furnace walls surrounding said water drums, neck pieces located within said walls for connecting said water drums, portions of the latter projecting at the rear beyond said furnace walls, neck pieces located outside said walls for connecting said rearwardly projecting portions and a transverse mud drum connected with each of the lowermost of said inclined water drums at their rearwardly projecting portions.

11. In a water tube steam generator, the combination of a series of sections, each consisting of an inclined water drum, a horizontal water drum situated vertically above said inclined water drum, furnace walls surrounding said water drums, neck pieces located within said walls for connecting said water drums, portions of the latter projecting at the rear beyond said furnace walls, neck pieces located outside said walls for connecting said rearwardly projecting portions, a transverse mud drum connected with each of said inclined water drums at their rearwardly projecting portions, and deflectors and baffles within said furnace walls to control the passage of the products of combustion.

12. In a water tube steam generator, the combination of a series of sections, each consisting of a plurality of inclined water drums located in a vertical row, a horizontal water drum situated vertically above said inclined water drums, furnace walls surrounding said water drums, neck pieces located within said walls for connecting said water drums, portions of the latter projecting at the rear beyond said furnace walls, neck pieces located outside said walls for connecting said rearwardly projecting portions, a transverse mud drum connected with each of the lowermost of said inclined water drums at their rearwardly projecting portions, and deflectors and baffles within said furnace walls to control the passage of the products of combustion.

In testimony whereof I affix my signature in presence of two witnesses.

NEWTON JOHN SUCKLING.

Witnesses:
ALEXANDER HOUSTON,
FREDERIC KEDGE.